(12) United States Patent
Langhans et al.

(10) Patent No.: US 10,741,068 B2
(45) Date of Patent: Aug. 11, 2020

(54) METHOD AND APPARATUS FOR RECOGNIZING AN ENVIRONMENT OF A VEHICLE

(71) Applicant: Robert Bosch GmbH, Stuttgart (DE)

(72) Inventors: Roland Langhans, Stuttgart (DE); Bernd Mueller, Leonberg (DE); Peter Sautter, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 16/117,793

(22) Filed: Aug. 30, 2018

(65) Prior Publication Data

US 2019/0080597 A1    Mar. 14, 2019

(30) Foreign Application Priority Data

Sep. 12, 2017   (DE) .................. 10 2017 216 016

(51) Int. Cl.
*G08G 1/0962*   (2006.01)
*G06K 9/03*   (2006.01)
(Continued)

(52) U.S. Cl.
CPC ....... *G08G 1/0962* (2013.01); *G06K 9/00798* (2013.01); *G06K 9/00805* (2013.01);
(Continued)

(58) Field of Classification Search
CPC .............. G08G 1/0962; G08G 1/0112; G08G 1/09623; G06K 9/03; G06K 9/72;
(Continued)

(56) References Cited

U.S. PATENT DOCUMENTS

| 2015/0371095 A1* | 12/2015 | Hartmann | ........ G06K 9/00791 348/148 |
| 2016/0052452 A1* | 2/2016 | Oh | ........ B60R 11/04 348/148 |

(Continued)

FOREIGN PATENT DOCUMENTS

| DE | 102013003944 A1 | 9/2014 |
| DE | 102016012345 A1 | 5/2017 |

OTHER PUBLICATIONS

Liu, Feng: "Objektverfolgung durch Fusion von Radar—und Monokameradaten auf Merkmalsbene fuer zukuenftige Fahrerassistenzsysteme" ["Object tracking by merging radar and mono camera data at feature level for future driver assistance system"], Dissertation, KIT Scientific Publishing (2009). pp. 1-149. [with English abstract].

*Primary Examiner* — Brandon J Miller
(74) *Attorney, Agent, or Firm* — Norton Rose Fulbright US LLP; Gerard Messina

(57) ABSTRACT

A method for recognizing an environment of a vehicle that has at least one environment sensor for furnishing information items regarding features of the environment includes evaluating a first information item that represents at least one feature of a first feature set in order to recognize whether a first situation of the vehicle exists and evaluating a second information item that represent at least one feature of a second feature set in order to recognize whether a second situation of the vehicle, differing from the first situation, exists, where the first and second feature sets have no common features.

15 Claims, 2 Drawing Sheets

(51) Int. Cl.
  *G06K 9/72* (2006.01)
  *G06K 9/00* (2006.01)
  *G08G 1/01* (2006.01)
  *G08G 1/04* (2006.01)

(52) U.S. Cl.
  CPC ..... *G06K 9/00818* (2013.01); *G06K 9/00825* (2013.01); *G06K 9/03* (2013.01); *G06K 9/72* (2013.01); *G08G 1/0112* (2013.01); *G08G 1/04* (2013.01)

(58) Field of Classification Search
  CPC ........... G06K 9/00798; G06K 9/00805; G06K 9/00818; G06K 9/00825; G06K 9/00791; G06K 9/6256; G06G 1/04
  See application file for complete search history.

(56) References Cited

U.S. PATENT DOCUMENTS

2017/0308989 A1* 10/2017 Lee .......................... B60R 11/04
2018/0312165 A1* 11/2018 Dudar ................ B60G 17/0195

\* cited by examiner

METHOD AND APPARATUS FOR RECOGNIZING AN ENVIRONMENT OF A VEHICLE

CROSS-REFERENCE TO RELATED APPLICATIONS

The present application claims priority under 35 U.S.C. § 119 to DE 10 2017 216 016.0, filed in the Federal Republic of Germany on Sep. 12, 2017, the content of which is hereby incorporated by reference herein in its entirety.

BACKGROUND

In the context of driver assistance systems and highly automated systems, a question that often is arises is how to ensure that a given situation, or an aspect of that situation, is correctly recognized. A substantial problem in that context is that an evaluation of the environmental sensor suite cannot, systematically, perfectly interpret all the available information.

It is possible to resort, for example, to maps in order to identify whether a vehicle is present on an expressway or on a road permitted for a specific use of a technical system. That information does not, however, as a rule offer sufficient reliability, and safety-relevant information should therefore be furnished via an environmental sensor suite.

The use of redundancies to solve safety problems is known.

SUMMARY

In light of the above, the approach presented here presents a method and an apparatus for recognizing an environment of a vehicle, and a corresponding computer program.

A method for recognizing an environment of a vehicle is presented, the vehicle being outfitted with at least one environment sensor for furnishing information items regarding features of the environment, the method including: evaluating (1) a first information item that represents at least one feature of a first feature set, in order to recognize whether a first situation of the vehicle does or does not exist; and (2) a second information item that represents at least one feature of a second feature set, in order to recognize whether a second situation of the vehicle, differing from the first situation, does or does not exist, the first feature set and the second feature set having no common features.

An "environment sensor" can be understood, for example, as an optical sensor, an ultrasonic sensor, a radar or lidar sensor. The information items can represent information items ascertained using the at least one environment sensor. The information items can exist in the form of electrical information signals. The information items can be read in directly from an interface of the at least one environment sensor, or can be ascertained using an environment signal furnished by the at least one environment sensor. A "feature," also called an "indicator," can be understood, for example, as a road sign, a lane marking, a lane width, a pedestrian, a lighted sign system, another vehicle, a planting or building, or another parameter suitable for characterizing a situation of the vehicle. The first information item can indicate, for example, that a specific feature of the first feature set is or is not present in the environment. Analogously thereto, the second information item can indicate that a specific feature of the second feature set is or is not present in the environment. The features can therefore also be referred to as "indicators." The first and the second situation can be, for example, mutually exclusive situations. For example, the first situation can be a situation on a high-speed road, and the second situation can be a situation in an urban area. The first and the second information item can be information items furnished mutually independently. The feature of the first feature set and the feature of the second feature set can correspondingly be mutually independent features in that, for example, the feature of the second feature set can be not simply a formal negation of the feature of the first feature set but can instead be a positively identified feature detected independently thereof. This can also apply conversely to the feature of the first feature set with respect to the feature of the second feature set. The features of the first and second feature set can have been detected, for example, by one and the same environment sensor or by several similar environment sensors.

According to an embodiment, a confirmation signal that confirms the existence of the first situation is furnished when the result of the evaluation is that the first situation does exist and the second situation does not exist.

This is based on the recognition that a safety-relevant function can be implemented for situation recognition by way of a first module for positive recognition of a situation, and a second module for negative recognition of the situation or for positive recognition of a non-situation. A consistency check can be carried out based on the recognitions. Advantageously, mutually independent criteria, whose data can be furnished, for example, by one and the same sensor or by similar sensors, such as a camera, can be utilized for situation recognition. The approach presented here makes possible, in particular, sufficient securing of machine learning methods used for situation recognition.

By way of a corresponding method, an environment information item can be secured and furnished with suitable reliability. A given information item can be ascertained in two ways. In the first form, a positive identification of an aspect to be evaluated can be carried out. The first module, which implements that positive identification, can supply, for example, a yes/no evaluation of the situation, for example along the lines of "yes, the situation does exist." The second module, conversely, can carry out a positive identification of a counterpart of that aspect, provided the counterpart is described well enough. For example, if the first module arrives at the conclusion that the situation in question does exist, and the second module at the conclusion that the counterpart to that situation does not exist, it can be assumed at a system level that the situation does exist. In order to optimize independence between the first and the second module, and so that redundancy does in fact take effect, it is important that the second module does not simply implement the algorithms of the first module in inverted form, but instead analyzes different information than the first module.

Advantages of the present approach are that the environment information can be used in secured form, that the method is usable for machine learning methods, and that a verification of independence between the modules can easily be carried out.

The method can encompass a step of detecting the first information item and/or the second information item using the at least one environment sensor. The method can furthermore be used, in the step of furnishing the confirmation signal, by a driver assistance system of the vehicle in order to perform a driving task.

According to an embodiment, in the evaluating step a first information item, which represents a feature of the first feature set which was not ascertained by negation of the feature of the second feature set, is evaluated. Additionally or alternatively, a second information item, which represents a feature of the second feature set which was not ascertained by negation of the feature of the first feature set, can be evaluated. Dependence between the features of the first and of the second feature set can thereby be avoided.

According to a further embodiment, in the evaluating step it is possible to recognize whether a second situation excluding the first situation does or does not exist. The first situation can thereby be recognized very dependably.

In an advantageous example, a first information item that represents a feature of a first feature set that encompasses as features a road sign, a road sign color, a multiple-lane condition, a lane width, a roadside structure, physically separated road routing, or a combination of at least two of the aforesaid features, is evaluated in the evaluating step. Additionally or alternatively, a second information item that represents a feature of a second feature set that encompasses as features cross traffic, a pedestrian, a further road sign differing from the road sign, a further road sign color differing from the road sign color, an intersection situation, a traffic signal, or a combination of at least two of the aforesaid features, can be evaluated. The second situation can thereby be recognized with great reliability as a situation excluding the first situation, or vice versa.

In addition, in the evaluating step the first information item can be evaluated in order to recognize the existence or nonexistence of the first situation as a function of a number and/or a frequency of occurrence of the feature of the first feature set. Additionally or alternatively, the second information item can be evaluated in order to recognize the existence or nonexistence of the second situation as a function of a number and/or a frequency of occurrence of the feature of the second feature set. The features of the first or the second feature set can thereby easily be weighted.

In an advantageous example embodiment, in a filtering step, the first information item is filtered in order to obtain a filtered first information item. Additionally or alternatively, the second information item can be filtered in order to obtain a filtered second information item. In the evaluating step, the filtered first information item can correspondingly be evaluated in order to recognize whether the first situation does or does not exist or, additionally or alternatively, the filtered second information item can be evaluated in order to recognize whether the second situation does or does not exist. For example, the filtered first information item can represent a smaller number of features than the first information item, and the filtered second information item can represent a smaller number of features than the second information item. The error susceptibility of the method can thereby be reduced.

According to an embodiment, in the filtering step the first information item and/or the second information item can be evaluated in order to discard features that are ambiguous and/or are intended for multiple use. Independence between the features of the first and the second feature set can thereby be ensured.

This method can be implemented, for example, in software or hardware or in a mixed form of software and hardware, for example in a control device.

The approach presented here furthermore creates an apparatus that is embodied to carry out, control, or realize the steps of a variant of a method presented here in corresponding devices. This variant embodiment of the invention in the form of an apparatus also allows the object on which the invention is based to be achieved quickly and efficiently.

The apparatus can have for that purpose at least one computation unit for processing signals or data, at least one memory unit for storing signals or data, at least one interface to a sensor or to an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like, and the memory unit can be a flash memory, an EPROM, or a magnetic memory unit. The communication interface can be embodied to read in or output data wirelessly and/or in wire-based fashion. A communication interface that can read in or output data in wire-based fashion can read in those data from a corresponding data transfer line, or output them into a corresponding data transfer line, for example, electrically or optically.

An "apparatus" can be understood in the present instance as an electrical device that processes sensor signals and, as a function thereof, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be separate integrated circuits, or to be made up at least in part of discrete components. With a software-based embodiment, the interfaces can be software modules that are present, for example, on a microcontroller alongside other software modules.

In an advantageous embodiment, control of the vehicle is effected by the apparatus. The apparatus can access for that purpose, for example, sensor signals such as acceleration, pressure, steering-angle, or environmental sensor signals. Control application is accomplished via actuators, such as brake actuators or steering actuators, or an engine control unit of the vehicle. In an embodiment, the method correspondingly contains the step of applying control to the vehicle based on the detected environment.

Also advantageous is a computer program product or computer program having program code that can be stored on a machine-readable medium or memory medium such as a semiconductor memory, a hard-drive memory, or an optical memory, and is used to carry out, realize, and/or control the steps of a method according to one of the embodiments described above, in particular when the program product or program is executed on a computer or on an apparatus.

Exemplifying embodiments of the invention are depicted in the drawings and are explained in further detail in the description that follows.

DETAILED DESCRIPTION

Figure 1:
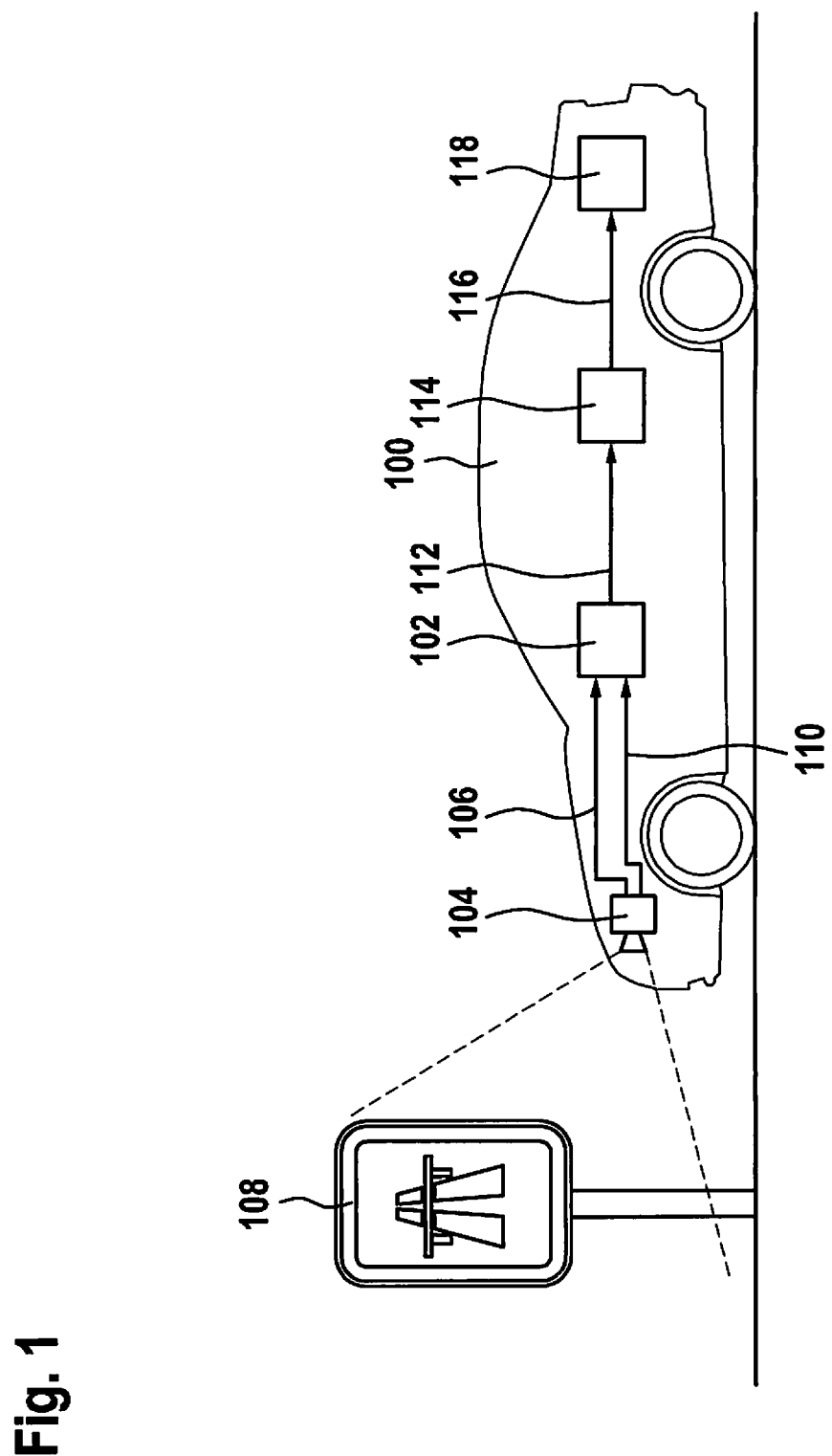
FIG. 1 schematically depicts a vehicle having an apparatus according to an example embodiment of the present invention.

In the description below of favorable example embodiments of the present invention, identical or similar reference characters are used for the elements depicted in the various figures which function similarly, repeated description of those elements being omitted.

FIG. 1 schematically depicts a vehicle 100 having an apparatus 102 in accordance with an example embodiment. Apparatus 102 for recognizing an environment of vehicle 100, for example a control unit, is coupled to an environment sensor 104. Environment sensor 104, for example a camera, is embodied to detect various features of the environment. Environment sensor 104 furnishes, via an environment sensor interface, a first information item 106, in the form of an electrical signal, which represents at least one feature of a first feature set whose features are associated with a first situation of vehicle 100, for example an expressway situation. For example, first information item 106 in FIG. 1 represents the presence of an expressway sign 108, located in the environment of vehicle 100, having a sign color (such as blue) that is typical of expressways. Environment sensor 104 furthermore makes available, via the environment sensor interface, a second information item 110, in the form of an electrical signal, which represents at least one feature of a second feature set whose features are associated with a second situation of vehicle 100 differing from the first situation. The first feature set and the second feature set are disjoint. It is particularly advantageous if the features of the second feature set are associated with a second situation opposite from the first situation, in this case e.g., an urban situation of vehicle 100. Second information item 110 accordingly represents, for example, the non-presence of an intersection situation in the environment of vehicle 100. Apparatus 102 receives the two information items 106, 110 from environment sensor 104, and evaluates them in order to recognize whether the first situation does or does not exist and furthermore to recognize whether the second situation does or does not exist. According to this example embodiment, apparatus 102 recognizes on the basis of first information item 106, i.e., on the basis of the detected expressway sign 108, that the first situation does exist; and recognizes on the basis of the second information item 110, i.e., based on the absence of intersections, that the second situation does not exist. Positive recognition of the nonexistence of the second situation thus represents a redundancy by which the existence of the first situation can be confirmed with very high reliability. As a result of the evaluation, apparatus 102 furnishes a confirmation signal 112 confirming the existence of the first situation.

Depending on the example embodiment, first information item 106 or second information item 110 represents a plurality of features of the relevant feature set, the features of the first feature set and the features of the second feature set always representing mutually independent features.

According to an alternative example embodiment, information items 106, 110 are furnished by different environment sensors. The different environment sensors, for example, can be disposed at different positions in vehicle 100 and/or can have different sensor properties.

According to an example embodiment, actuation signal 112 is used by a driver assistance system 114 to perform a driving task. According to an example embodiment, apparatus 102 is part of driver assistance system 114. According to an example embodiment, driver assistance system 114 is embodied to furnish, using actuation signal 112, a control signal 116 for controlling a functional unit 118 of vehicle 100, for example a propulsion system, a braking device, or a steering system.

Figure 2:
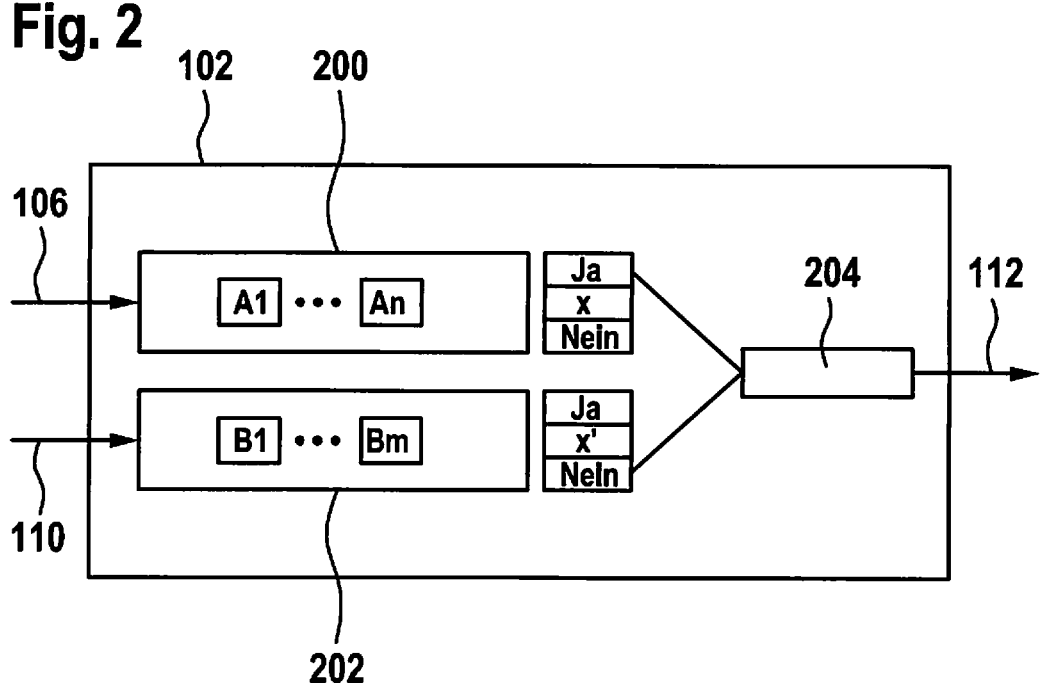
FIG. 2 schematically depicts an apparatus of FIG. 1 according to an example embodiment of the present invention.

FIG. 2 schematically depicts an apparatus 102 of FIG. 1. According to an example embodiment, apparatus 102 is implemented as a hardware component or as part of a hardware component for a vehicle. Apparatus 102 encompasses a first module 200 for processing first information item 106, and a second module 202 for processing second information item 110 independently of first module 200. Proceeding from an indeterminate state X, first module 200 recognizes, on the basis of at least one feature of the first feature set having first indicators $A_1 \ldots A_n$ as elements, whether first situation does or does not exist. Analogously thereto, proceeding from an indeterminate state X', second module 202 recognizes, on the basis of at least one feature of the second feature set having second indicators $B_1 \ldots B_m$ as elements, whether the second situation does or does not exist. The existence of the first or second situation is, for example, responded to in each case with a Yes, and nonexistence in each case with a No. If what results upon evaluation of first information item 106 is a Yes and upon evaluation of second information item 110 a No, as shown in FIG. 2, then configuration signal 112, which indicates that the first situation is definitely correct, is furnished by a furnishing unit 204 of apparatus 102.

The approach presented here will be described below using the example of the question as to whether the vehicle is on an expressway. That question is evaluated by first module 200 directly on the basis of the first indicators, which each suggest an expressway. Indicators associated with an expressway situation are, for example, expressway signs, a multiple-lane condition, a lane width, roadside structures, separate physical routing, or special signs that occur only on expressways.

It is advantageous if first module 200 is embodied to reject specific information in the context of situation recognition by way of corresponding filtering, for example detected signs that indicate the end of an expressway, or also navigation information, if that information is used systematically elsewhere or negatively affects independence between the two modules 200, 202.

For example, a suitable selection of training data in the context of use of a machine learning method ensures that, from the initially indeterminate state X, first module 200 arrives at a Yes only when the first indicators occur sufficiently often. The application based on this method governs whether the indeterminate states X, X' are introduced or always respectively supplement one side, for example X=No for first module 200 and X'=Yes for second module 202.

Second module 202 evaluates, for example, on the basis of suitable second indicators, the question "Is the system somewhere else?" Such indicators are, for example, cross traffic, pedestrians, signs that occur in cities, place-name signs, speed limits of up to 70 km/h, intersection situations, yellow as a sign color, or traffic signals. In order to establish the desired independence, it is important that the second indicators not simply represent negations of the first indicators.

For example, an arbitrary second indicator $B_i$ should not simply represent the absence of expressway signs if a first indicator $A_i$ checks for the presence of expressway signs. In such a case, independence between the two modules 200, 202 would be impaired or at least difficult to justify. The evaluations carried out by the two modules 200, 202 should therefore be positive identifications.

The intention of the approach presented here is to use the first and second indicators respectively as positive confirmations of a feature or property, and not as negative confirmations of the absence of a feature or property, which would be equivalent to a negative identification. Independence in the evaluation of the indicators can thereby be ensured at a design level.

A recognition method of this kind furthermore supports simple verification and simple validation of independence based on the indicators. For example, the feature combination "pedestrian recognized"+"separate physical routing" can be illustratively analyzed, argued, and validated by the environmental sensor suite for common error sources. If the method is used together with machine learning methods, that can be assured by selecting suitable training data.

According to FIG. 2, a definite state is recognized only when first module 200 detects that the system is located on the expressway and when second module 202 detects that the system is not located somewhere else. Advantageously, it is comparatively simple to improve the two modules by gaining experience. In addition to improving indicators, it is also easy to add new indicators to the feature sets.

Figure 3:
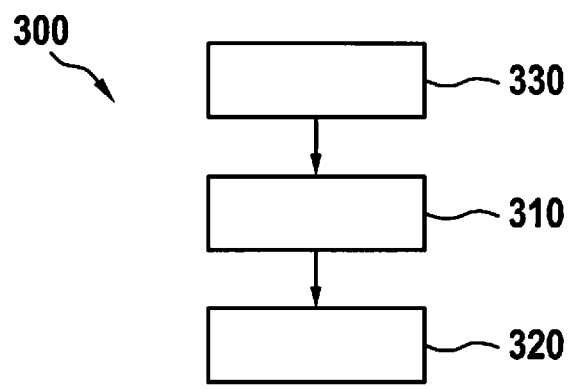
FIG. 3 is a flowchart that illustrates a method according to an example embodiment of the present invention.

FIG. 3 is a flowchart of a method 300 according to an example embodiment. Method 300 for recognizing an environment of a vehicle can be executed, for example, by the apparatus described with reference to FIG. 2. In a step 310, the two information items furnished by the environment sensor are evaluated in terms of detected features of the environment, in order to detect whether the first situation does or does not exist or whether the second situation does or does not exist. In an optional further step 320, the configuration signal confirming the existence of the first situation is furnished if it is found, upon evaluation of the two information items, that the first situation does exist and the second situation does not exist. The second situation represents here, in particular, a situation that is opposite to the first situation or excludes it.

According to an example embodiment, the information items are detected in a preceding step 330 using one or several environment sensors.

If an example embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for recognizing an environment of a vehicle, the vehicle including at least one environment sensor, the method comprising:
evaluating a first information item that is obtained from the at least one environment sensor and that represents at least one feature of a first feature set, thereby recognizing whether a first situation of the vehicle exists;
evaluating a second information item that is obtained from the at least one environment sensor and that represents at least one feature of a second feature set, thereby recognizing whether a second situation of the vehicle exists, wherein the first and second situations are different and the second feature set does not include any features in common with the first feature set; and
outputting a confirmation signal that confirms existence of the first situation when: a result of the evaluation of the first information item is that the first situation does exist and a result of the evaluation of the second information item is that the second situation does not exist.

2. A method for recognizing an environment of a vehicle, the vehicle including at least one environment sensor, the method comprising:
evaluating a first information item that is obtained from the at least one environment sensor and that represents at least one feature of a first feature set, thereby recognizing whether a first situation of the vehicle exists;
evaluating a second information item that is obtained from the at least one environment sensor and that represents at least one feature of a second feature set, thereby recognizing whether a second situation of the vehicle exists, wherein the first and second situations are different and the second feature set does not include any features in common with the first feature set; and
controlling a driver assistance system of the vehicle to perform a driving task in response to a result of the evaluation of the first information item being that the first situation does exist and a result of the evaluation of the second information item being that the second situation does not exist.

3. The method of claim 2, further comprising the at least one environment sensor sensing at least one of the first and second information items.

4. The method of claim 2, wherein the first information item is ascertained without negation of any feature of the second fature set.

5. The method of claim 4, wherein the second information item is ascertained without negation of any feature of the first fature set.

6. The method of claim 2, wherein the presence of the second situation excludes presence of the first situation.

7. The method of claim 2, wherein the first feature set includes as features one or more of the following: a road sign, a road sign color, a multiple-lane condition, a lane width, a roadside structure, and physically separated road routing.

8. The method of claim 2, the first feature set includes as features one or more of the following: cross traffic, a pedestrian, an intersection situation, and a traffic signal.

9. The method of claim 2, wherein:
the first feature set includes as features one or more of the following: a road sign, a road sign color, a multiple-lane condition, a lane width, a roadside structure, and physically separated road routing; and
the second feature set includes as features one or more of the following: cross traffic, a pedestrian, an intersection situation, and a traffic signal.

10. The method of claim 2, wherein:
the first feature set includes as features at least one of a road sign and road sign color; and
the second feature set includes as features at least one of a road sign or road sign color differing from the road sign or road sign color of the first feature set.

11. The method of claim 2, wherein whether the first situation exists is recognized as a function of at least one of a number and a frequency of occurrences of the feature of the first feature set.

12. The method of claim 11, wherein whether the second situation exists is recognized as a function of at least one of a number and a frequency of occurrences of the feature of the second feature set.

13. The method of claim 2, further comprising filtering the first information item, the second information, or both the first and second information items prior to the respective evaluations.

14. A device for providing information about an environment of a vehicle, the vehicle including at least one environment sensor, the device comprising:
an interface to the at least one environment sensor;
an output; and
a processor, wherein the processor is configured to:

evaluate a first information item that is obtained via the interface from the at least one environment sensor and that represents at least one feature of a first feature set, thereby recognizing whether a first situation of the vehicle exists;

evaluate a second information item that is obtained via the interface from the at least one environment sensor and that represents at least one feature of a second feature set, thereby recognizing whether a second situation of the vehicle exists, wherein the first and second situations are different and the second feature set does not include any features in common with the first feature set;

output information corresponding to a result of the evaluations via the output, and control a driver assistance system of the vehicle to perform a driving task in response to a result of the evaluation of the first information item being that the first situation does exist and a result of the evaluation of the second information item being that the second situation does not exist.

15. A non-transitory computer-readable medium on which are stored instructions that are executable by a processor and that, when executed by the processor, cause the processor to perform a method for recognizing an environment of a vehicle, the vehicle including at least one environment sensor, the method comprising:

evaluating a first information item that is obtained from the at least one environment sensor and that represents at least one feature of a first feature set, thereby recognizing whether a first situation of the vehicle exists;

evaluating a second information item that is obtained from the at least one environment sensor and that represents at least one feature of a second feature set, thereby recognizing whether a second situation of the vehicle exists, wherein the first and second situations are different and the second feature set does not include any features in common with the first feature set; and controlling a driver assistance system of the vehicle to perform a driving task in response to a result of the evaluation of the first information item being that the first situation does exist and a result of the evaluation of the second information item being that the second situation does not exist.

* * * * *